Sept. 3, 1963 L. R. HARPER 3,102,986

PULSE GENERATOR WITH TWO DIFFERENT ALTERNATE SEQUENCES

Filed May 12, 1960

INVENTOR
LEONARD R. HARPER

BY Lester W. Clark

ATTORNEY 3,102,986

PULSE GENERATOR WITH TWO DIFFERENT ALTERNATE SEQUENCES

Leonard Roy Harper, San Jose, Calif., assignor to International Business Machines Corporation, New York, N.Y., a corporation of New York Filed May 12, 1960, Ser. No. 28,786
5 Claims. (Cl. 331—57)

This invention relates to apparatus for producing a sequence of electrical pulse cycles with periods of unequal length between the pulses. Such an apparatus is of particular utility in timing the sequence of operations in a digital computer. The invention, however, has broader utility in any control apparatus where such a sequence of unequal time periods is desired.

In digital computers, it is common to control the sequence of events by means of a master timer, which repeatedly goes through a master timing cycle. Some events in the computer are relatively complex and require a longer time for their completion, while other events are relatively simple and can be completed in a shorter time. For example, the operation of selecting a certain locality in a memory unit where a particular bit of information is stored generally requires a relatively long time, whereas the operation of reading that bit out of the memory unit after its location has been selected requires a relatively short time. In order to save time, each period of the timing cycle is made only as long as the time required for a particular operation. A master timer unit for a digital computer is therefore required to go through a timing cycle consisting of a plurality of periods of unequal length.

A common form of timing unit utilized for that purpose is a ring circuit consisting of a plurality of multivibrators connected in cascade, with the output of each connected to the input of a following multivibrator in the ring circuit. The output of the last multivibrator is connected to the input of the first, so that the ring is continuous. For example, such a ring circuit may include 22 multivibrator stages, and is so constructed that only one of the 22 stages is on at any particular time. The frequency of each multivibrator is, for example, one megacycle, so that each multivibrator stays on for one microsecond and then turns off again. In turning off, it turns on the following multivibrator in the ring. Such a ring would go through a complete cycle in 22 microseconds, each cycle including 22 individual periods of one microsecond each. During each period a signal would be produced at a particular one of the 22 output terminals of the ring. A timing cycle consisting of four periods consisting of respectively 8, 7, 4 and 3 microseconds each, could then be set up by taking outputs from the 8th, 15th, 19th and 22nd multivibrators in the ring.

It is an object of the present invention to provide an improved and simplified apparatus for producing a repeated sequence of electrical pulses separated by predetermined periods of unequal length.

The foregoing object is obtained in the apparatus described herein. In that apparatus, there is utilized a multivibrator circuit having its frequency controllable by the application of a variable voltage to an input terminal. In the particular apparatus described, the multivibrator includes two transistors which are cross coupled by unsymmetrical cross coupling networks, so that the "on" time of one transistor is different from the "on" time of the other. One output terminal of the multivibrator is connected to a single shot or monostable circuit, whose output is connected to the input of a binary counter. The binary counter has a bistable output, and is shifted back and forth between its two output conditions in response to pulses from the single shot. The output of the binary counter is connected to that input terminal of the multivibrator which controls its frequency. Consequently, the multivibrator goes through a sequence of one cycle having one predetermined period, followed by a different cycle having a shorter period.

Other objects and advantages of the invention will become apparent from a consideration of the following specification and claims, taken in connection with the accompanying drawing.

Figure 1:
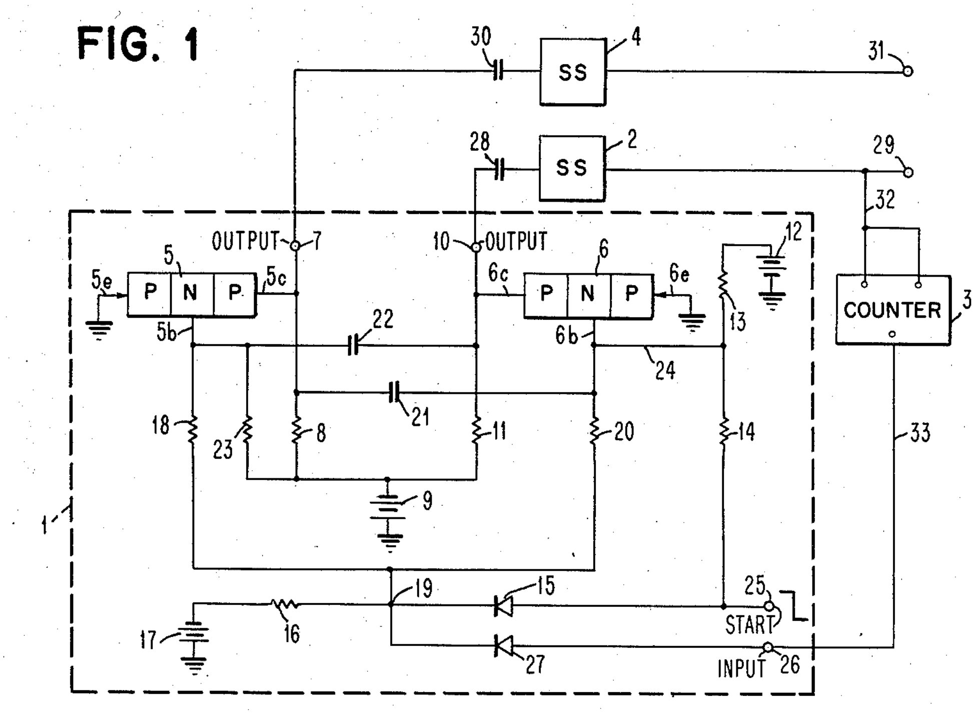
FIG. 1 is a wiring diagram of a timing apparatus embodying the invention.

The principal units in the apparatus shown in FIG. 1 are a multivibrator 1, a single shot 2 connected to an output terminal 10 of the multivibrator 1, and a binary counter 3 connected to receive pulses from the output of the single shot 2 and to supply potentials to a frequency controlling input of the multivibrator 1. Another single shot 4, which may be the same as the single shot 2, may be connected to another output terminal of the multivibrator 1, in any situation where the second shot is required, as described in detail below.

The single shots 2 and 4 may be of the type described in my copending application Serial No. 706,524, filed December 31, 1957, now United States Patent No. 2,937,-291, issued May 17, 1960. Any other suitable single shot circuit may be used. The binary counter 3 may be a multivibrator of the type shown in FIG. 2 of my application Serial No. 706,486, filed December 31, 1957, now Patent No. 3,003,070, providing that circuit is modified for use as a binary counter, as suggested in that application. Any other suitable binary counter may be used. The counter 3 may be either a single stage counter as suggested above, or it may be a multiple stage counter for switching its output only after a large number of input signals, instead of after each alternate input signal, as in the modification presently described.

The multivibrator 1 includes two transistors 5 and 6, having emitter electrodes *5e*, *6e*, base electrodes *5b*, *6b* and collector electrodes *5c*, *6c*. The emitters *5e*, *6e* are grounded and serve as the common terminals of the transistors. Collector electrode *5c* is connected to a multivibrator output terminal 7 and is also connected through a load resistor 8 and a load supply battery 9 to ground. Collector *6c* is connected to a multivibrator output terminal 10 and is also connected through a load resistor 11 and the load supply battery 9 to ground. The collector electrodes serve as the output electrodes of the transistors.

The base electrodes *5b*, *6b* serve as the input electrodes of the transistors. A voltage divider is provided for supplying biasing potentials for the base electrodes *5b*, *6b* with respect to the grounded emitters *5e*, *6e*. This voltage divider includes a battery 12, resistors 13 and 14, a diode 15, a resistor 16, and a battery 17, all connected in series. The negative terminal of battery 12 and the positive terminal of battery 17 are grounded. Base *5b* is connected through a resistor 18 to the common junction 19 between diode 15 and resistor 16 in the voltage divider. Base electrode *6b* is connected through a resistor 20 to the same common junction 19.

Collector electrode *5c* is cross coupled to base electrode *6b* through a capacitor 21. Collector electrode *6c* is cross coupled to base electrode *5b* through a capacitor 22. In the case where an unsymmetrical output, i.e., unequal on times of the two transistors, is desired, these capacitors may be of different values.

A starting input terminal 25 is connected to the anode of diode 15, for the purpose of blocking that diode by means of an input pulse signal to start the multivibrator oscillating. To keep the multivibrator oscillating, the terminal 25 is held at −6 volts. To stop the oscillations, terminal 25 is switched to a more positive potential, e.g. 0 volts.

A frequency controlling input terminal 26 is connected through a diode 27 to the common junction 19 in the voltage divider.

Output terminal 10 is connected through a capacitor 28 to the input of single shot 2, whose output is connected to a timing output terminal 29. Multivibrator output terminal 7 is similarly connected through a coupling capacitor 30 to the input of single shot 4, whose output is connected to a timing output terminal 31.

Output terminal 29 is connected through a wire 32 to the joined input terminals of a binary counter 3 having an output terminal connected through a wire 33 to the frequency controlling input terminal 26 of the multivibrator.

*Operation*

The multivibrator 1 switches alternately between two conditions. In one of those conditions, the transistor 5 is in a relatively high current conducting condition, hereinafter termed the "on" condition, and the transistor 6 is in a relatively low current conducting condition, hereinafter termed the "off" condition. In the other of the two operating conditions of multivibrator 1, the transistor 6 is in its high current condition and the transistor 5 is in its low current condition.

Figure 2:
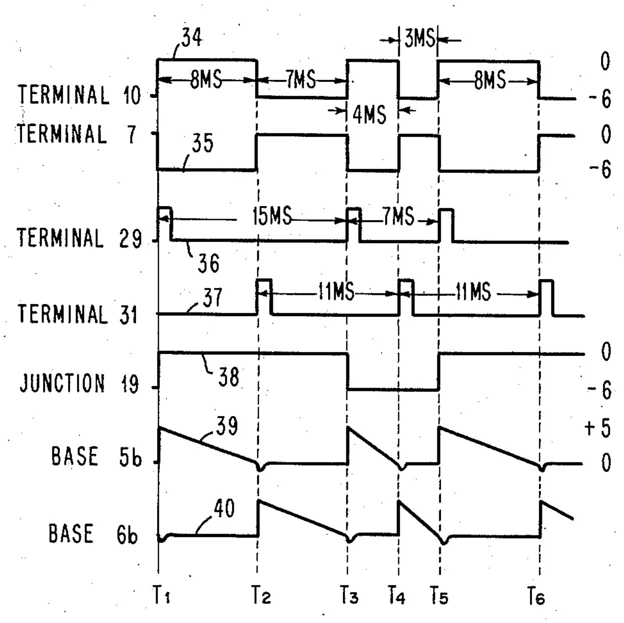
FIG. 2 is a graphical illustration of the wave forms existing at various points in the circuit of FIG. 1, during its operation.

At the time $T_1$ illustrated in FIG. 2, the transistor 6 switches from its "off" condition to its "on" condition and the transistor 5 switches off. When transistor 6 switches "on," its collector, and hence the output terminal 10, change from a potential substantially equal to that of the negative terminal of battery 9 (shown in FIG. 2 as −6 volts) to a potential substantially equal to ground potential. This positive-going swing is illustrated at time $T_1$ in line 34 in FIG. 2. This positive-going potential pulse at collector 6c is transmitted through capacitor 22 to base 5b, swinging the base 5b positive, as illustrated in line 39 in FIG. 2. The capacitor 22 becomes positively charged during this positive swing of the potential of collector 6c. This positive charge on capacitor 22 gradually leaks off. Two principal leakage paths are provided. One of these leakage paths is through the resistors 11 and 23, which remains substantially constant in its effect. The other leakage path may be traced from one side of capacitor 22 through resistors 18 and 16 and batteries 17, 9 and resistor 11 to the opposite side of capacitor 22. The effect of this last path is dependent upon the potential at the junction 19, which in effect is a potential opposing the flow of discharging current from capacitor 22.

As capacitor 22 discharges, the potential at base 5b follows the line 39 in FIG. 2, falling slowly toward ground. When the base 5b reaches ground potential, transistor 5 turns "on" and its collector 5c swings in a positive sense, as indicated at time $T_2$ in line 35 of FIG. 2. Transistor 5 going "on" transmits a positive pulse through capacitor 21 to base 6b. This positive pulse is effective to turn the transistor 6 off. The variation in potential of base 6b is illustrated in line 40 in FIG. 2. Transistor 6 remains off as long as the charge on capacitor 21 maintains base 6b above ground potential. The charge on capacitor 21 gradually leaks off. Again, two principal leakage paths are provided. One of these may be traced through wire 24 and resistor 14 to terminal 25, which is held at the same potential as the point common to resistor 8 and battery 9. The other side of capacitor 21 discharges to that common potential through resistor 8. The effectiveness of this leakage path is substantially constant. The other leakage path may be traced through resistor 20, resistor 16, batteries 17 and 9 and resistor 8. The effectiveness of this latter path is dependent upon the potential at junction 19, which in effect is a potential opposing the flow of discharging current from the capacitor 21.

As illustrated in FIG. 2, the various resistors and capacitors may be selected so that, when junction 19 is at ground potential the transistor 5 remains "on" for a period of 8 microseconds and the transistor 6 remains "on" for a period of 7 microseconds.

Whenever the output terminal 10 of multivibrator 1 swings in a positive sense, it produces an input pulse for single shot 22, causing that circuit to produce an output pulse at the terminal 29, as illustrated in the line 36, FIG. 2. This output pulse is fed to the binary counter 3, and is effective to switch that counter between its two output states. In the arrangement shown, it is assumed that the counter 3 is a single stage counter, and switches between its output states in response to each input pulse. The output states of counter 3 are transmitted through gating diode 27 to the junction 19 in the voltage divider and are there effective to determine the discharge times of the capacitors 21 and 22. When the output of counter 3 is at its more positive value, it transmits a larger current through the diode 27 and resistor 16, thereby establishing the potential of junction 19 at a more positive value, illustrated as ground in the line 38 in FIG. 2. The positive potential opposing the discharge of capacitor 21 and 22 through a part of their discharge network is thereby increased, making the times required to discharge of those capacitors relatively long. On the other hand, when the junction 19 is swung to its more negative value, as illustrated between the time $T_3$ and $T_5$ in FIG. 2, this opposing potential is reduced, and the capacitors 21 and 22 discharged more quickly. Under those circumstances, the transistor 5 remains "off" for 4 microseconds and the transistor 6 remains "off" for 3 microseconds.

It may be seen that the signal at output 10 consists of a sequence of "on" and "off" periods as shown in line 34 of FIG. 2, comprising an 8 microsecond "on" period, a 7 microsecond "off" period, a 4 microsecond "on" period and a 3 microsecond "off" period. The entire sequence is then repeated. At output terminal 29, there appears a sequence of spaced pulses in which one pair is separated by 15 microseconds and the next pair by 7 microseconds. On the other hand, there appears at output terminal 31 a sequence of equally spaced pulses, all 11 microseconds apart.

Output may be taken from the various output terminals 29, 31, 7 and 10 as may be required to control the sequence of events in the apparatus being regulated.

While I prefer to make the multivibrator 1 unsymmetrical by making capacitors 21 and 22 unequal, the same result might be secured by making resistors 8 and 11 unequal, or by making resistors 23 and 14 unequal.

While I have shown the multivibrator 1 as being unsymmetrical, and while the use of such a multivibrator provides a more versatile apparatus, in that a larger number of different time intervals may be secured, it is nevertheless not necessary to the broader aspects of my invention that the multivibrator 1 be unsymmetrical. In other words, the "on" periods of the two transistors 5 and 6 could be made equal.

While I have shown and described a single stage binary counter 3, it may be understood that this counter could be replaced by a multiple stage counter, which shifts the potential at the junction 19 only in response to every second or fourth or eighth or some other predetermined ordinal numbered pulse.

While I have shown and described a preferred embodiment of my invention, other modifications thereof will readily occur to those skilled in the art, and I therefore intend my invention to be limited only by the appended claims.

I claim:

1. Apparatus for generating a sequence of pulse cycles including periods of unequal length, comprising a free-running multivibrator including an output terminal, a frequency controlling network and an input terminal connected to the network, said network being effective in response to a variation in potential at the input terminal to vary the frequency of the multivibrator, a single shot having an output terminal and an input terminal coupled to the output terminal of the multivibrator, a binary counter having an input terminal connected to the single shot output terminal and an output terminal shiftable between two separated potentials in response to a predetermined number of pulses at the single shot output terminal, and means connecting the counter output terminal and the input terminal of the frequency controlling network and effective to establish one period of oscillation for the multivibrator when the counter output terminal is at one of its two potentials, and a different period of oscillation when the counter output terminal is at the other of said two potentials.

2. Apparatus as defined in claim 1, in which said multivibrator includes a complementary output terminal, a second single shot having an output terminal and an input terminal coupled to the complementary output terminal of the multivibrator, the multivibrator and the second single shot cooperating to produce at its output terminal a sequence of equally spaced pulses.

3. Apparatus as defined in claim 1, in which said multivibrator produces at its output terminal signals which shift between two separated values at unequal intervals.

4. Apparatus for generating a sequence of pulse cycles including periods of unequal length, comprising a free-running multivibrator including two variable impedance devices, each having input, output and common electrodes, cross-coupling means connecting the output electrode of each device to the input electrode of the other device, means biasing the input electrodes comprising a source of direct electric potential, a voltage divider connected to said source, and means connecting the input electrodes to the voltage divider, a single shot having an input terminal coupled to one output electrode of the mutivibrator and an output terminal, a binary counter having an input terminal connected to the single shot output terminal and an output terminal shiftable between two separated potentials in response to a predetermined number of pulses at the single shot output terminal, a gate connected between the counter output terminal and the voltage divider and effective when the counter output terminal is at one only of its two potentials to open and pass current to at least a portion of the voltage divider, thereby to shift the bias potential on the input electrodes of the multivibrator and to establish one period of oscillation for the multivibrator when the counter output terminal is at said one potential, and a different period of oscillation when the counter output terminal is at the other of said two potentials.

5. A multivibrator having an output cycle with unequal positive and negative portions, comprising two variable impedance devices, each having input, output and common electrodes, capacitive cross-coupling means connecting the output electrode of each device to the input electrode of the other device, two networks having unequal time constants and connected respectively between the input electrodes and the common electrodes of the variable impedance devices, load energy supply means, two load impedances connecting the load energy supply means to the respective output electrodes; one of said two networks comprising a resistor connected between its associated input electrode and one terminal of the load energy supply means; a voltage divider, and second energy supply means connected to the voltage divider, the other of said two networks comprising a connection between its associated input electrode and a point on said voltage divider having a potential at times substantially different from that of said one terminal of the load energy supply means.

References Cited in the file of this patent

UNITED STATES PATENTS

| | | |
|---|---|---|
| 2,774,872 | Howson | Dec. 18, 1956 |
| 2,848,610 | Freienmuth | Aug. 19, 1958 |

OTHER REFERENCES

"A New Angular Velocity-Modulation System Employing Pulse Techniques," by J. F. Gordon in Proc. of the IRE, vol. 34, No. 6, June 1946, pages 328 to 334.